US006769160B2

(12) United States Patent
Higuchi et al.

(10) Patent No.: US 6,769,160 B2
(45) Date of Patent: Aug. 3, 2004

(54) PROCESS FOR MANUFACTURING ELECTRONIC PART

(75) Inventors: Shoichi Higuchi, Shiga-ken (JP); Tatsuo Kunishi, Takefu (JP); Yukio Hamaji, Otsu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 319 days.

(21) Appl. No.: 10/087,767

(22) Filed: Mar. 5, 2002

(65) Prior Publication Data

US 2002/0135972 A1 Sep. 26, 2002

Related U.S. Application Data

(62) Division of application No. 09/680,610, filed on Oct. 6, 2000, now Pat. No. 6,373,683.

(30) Foreign Application Priority Data

Oct. 8, 1999 (JP) .......................................... 11-288175

(51) Int. Cl.[7] ................................................ H01G 7/00
(52) U.S. Cl. ...................... 29/25.42; 29/25.03; 29/619; 29/840; 205/50; 361/321.3; 427/404; 428/646
(58) Field of Search ............................ 29/25.02, 25.03, 29/25.01, 25.41, 25.42, 619, 620, 621, 830, 840; 205/50, 69, 506, 507, 610; 361/303–305, 306.1, 307, 308.1, 309–310, 313, 321.1–321.5; 427/383.3, 404; 428/209, 336, 621, 643, 646

(56) References Cited

U.S. PATENT DOCUMENTS 5,532,070 A  *  7/1996  Takahashi et al. ........... 428/643
5,614,074 A  *  3/1997  Ravindranathan ............ 205/50
5,822,176 A  * 10/1998  Sano et al. ................ 361/321.4
6,403,234 B1 *  6/2002  Kodama et al. ............. 428/648

FOREIGN PATENT DOCUMENTS

JP        409209171 A   *  8/1997   ............ C23C/28/00
JP        410172807 A   *  6/1998   ............. H01C/7/04
JP        10-306396          7/1998
JP        11-193489          7/1999

OTHER PUBLICATIONS

JP Office Action dated Jul. 17, 2002 with English translation.

* cited by examiner

Primary Examiner—Peter Vo
Assistant Examiner—Donghai D. Nguyen
(74) Attorney, Agent, or Firm—Dickstein, Shapiro, Morin & Oshinsky, LLP

(57) ABSTRACT

A process for manufacturing an electronic part having a ceramic body and an outer electrode form on the surface of the body, the outer electrode including a plurality of layers and having a Sn plating layer as the outermost layer. The Sn plating layer having an average crystal grain size of about 1 μm or less is formed on a Ni or Ni alloy by electroplating in a plating bath having a pH of about 3 to 10.

7 Claims, 1 Drawing Sheet

PROCESS FOR MANUFACTURING ELECTRONIC PART

This is a divisional of U.S. patent application Ser. No. 09/680,610, filed Oct. 6, 2000, now U.S. Pat. No. 6,373,683 B1, in the name of Shoichi HIGUCHI, Tatsuo KUNISHI and Yukio HAMAJI, entitled ELECTRONIC PARTS, AND PROCESS FOR MANUFACTURING ELECTRONIC PARTS.

BACKGROUND OF THE INVENTION

1. Field of the Invention

The present invention relates to an electronic part having a Sn plating layer as the outermost layer of an outer electrode.

2. Description of the Related Art

In chip type multilayer capacitors and other electronic parts, for example, an outer electrode formed outside a chip body is generally installed on, for example, a printed wiring board by soldering. A configuration having a Sn plating layer as the outermost layer of the outer electrode is employed in many cases to improve soldering property at relatively low cost. This is because Sn plating layers have the merits of very satisfactory wettability and of suppressing the occurrence of defective installment when the electronic part is installed by reflow, flow or another treatment.

When a Sn plating layer is formed in an outer electrode of the electronic part, a Ni underlayer or Ni alloy underlayer is generally formed under the Sn plating layer to improve solder temperature resistance. The Ni underlayer and Ni alloy underlayer act to prevent a thick film electrode formed on the surface of the chip body from melting and being absorbed in the solder upon soldering.

Incidentally, the Sn plating layer is known to invite the formation of whisker-like protrusions called as "whiskers". Such whiskers are formed only by leaving the Sn plating layer standing at constant temperatures, but the mechanism of its formation has not yet been clarified. If the whisker is formed in an outer electrode of an electronic part installed on a circuit board, there is a possibility of an electrical short-circuit between the electronic part and an adjacent part or a wiring pattern.

As techniques for retarding whiskers in a Sn plating layer, the following techniques have been proposed. For example, there is a technique of adding a small amount of Pb, Ag, Bi or another metal to a Sn plating layer to yield a Sn alloy plating layer, and a technique of dividing the Sn plating layer into two layers, i.e., a lower layer having a smaller crystal grain size and an upper layer having a larger crystal grain size, as disclosed in Japanese Unexamined Patent Application Publication No. 2-170996. However, quality control of a plating bath is difficult using the technique of forming a Sn alloy plating layer. The technique of dividing the Sn plating layer into two layers has the following problems. Specifically, when a Sn plating layer is formed in an outer electrode of an electronic part, a Ni underlayer or Ni alloy underlayer must be formed under the Sn plating layer to improve the solder temperature resistance, as mentioned above. When dividing a Sn plating layer into two layers, the two Sn plating layers must be formed on a Ni underlayer or Ni alloy underlayer formed on a thick film electrode. This technique therefore requires two Sn plating steps and is disadvantages in cost.

In this connection, the Ni underlayer and Ni alloy underlayer formed in order to improve the solder temperature resistance of an outer electrode of an electronic part also advantageously serves to inhibit the formation of whiskers in a Sn plating layer. Accordingly, when a Sn plating layer is formed in an outer electrode of an electronic part, the formation of such a Ni underlayer or Ni alloy underlayer under the Sn plating layer can improve the solder temperature resistance of the outer electrode and concurrently can inhibit the formation of whiskers in the Sn plating layer when the electronic part is placed at constant temperatures.

However, it has been clarified in recent years that even such an electronic part having a Ni underlayer or Ni alloy underlayer formed under the Sn plating layer of the outer electrode invites the formation of whiskers if the electronic part is left under conditions where high temperature conditions and low temperature conditions are repeated. Whiskers formed under such conditions frequently have bending shapes and have lengths of hundred and several ten micrometers, in contrast to whiskers formed at constant temperatures. The mechanism of the formation of this type of whiskers has not yet been clarified, but it is supposed that the mechanism acting in this case is quite different from that of whiskers formed at constant temperatures. This supposition is based on the difference in formation conditions and difference in shapes of whiskers. In the future, intervals or spaces between individual parts and between wiring patterns will further decrease with increasing packing densities of circuit parts, and the risk of defective short-circuits due to the whiskers as above further is expected to increase more and more.

SUMMARY OF THE INVENTION

Accordingly, an object of the present invention is to provide an electronic part which can avoid the formation of whiskers in a Sn plating layer formed in an outer electrode, even in surroundings where high temperature conditions and low temperature conditions are repeated.

The electronic part comprises: a body and an outer electrode formed on the surface of the body, the outer electrode comprising a plurality of layers and having a Sn plating layer as the outermost layer. The Sn plating layer has an average crystal grain size of about 1 $\mu$m or less.

It is preferable that a Ni layer or a Ni alloy layer is formed under the Sn plating layer, and a thick film electrode may be further formed under the a Ni layer or Ni alloy layer. The body is preferably a ceramic body.

A method for producing an electronic part comprises the steps of: preparing a ceramic body; forming a thick film electrode on the surface of the ceramic body; forming a Ni layer or Ni alloy layer on the thick film electrode; and forming a Sn plating layer having an average crystal grain size of about 1 $\mu$m or less on the Ni layer or Ni alloy layer through a plating bath with a pH of about 3 to 10.

As is described above, according to the present invention a Sn plating layer is has a fine average crystal grain size of about 1 $\mu$m or less in an electronic part including a body and an outer electrode formed on the surface of the body and having the Sn plating layer as the outermost layer, and the formation of whiskers in the Sn plating layer can be inhibited even in surroundings where high temperature conditions and low temperature conditions are repeated. When this electronic part is installed in a circuit board, the occurrence of electric short-circuits with an adjacent part or wiring pattern can be inhibited even in surroundings where temperatures vary depending on the state of use.

For the purpose of illustrating the invention, there is shown in the drawing a form which are presently preferred, it being understood, however, that the invention is not limited to the precise arrangements and instrumentalities shown.

DETAILED DESCRIPTION OF PREFERRED EMBODIMENTS

Figure 1:
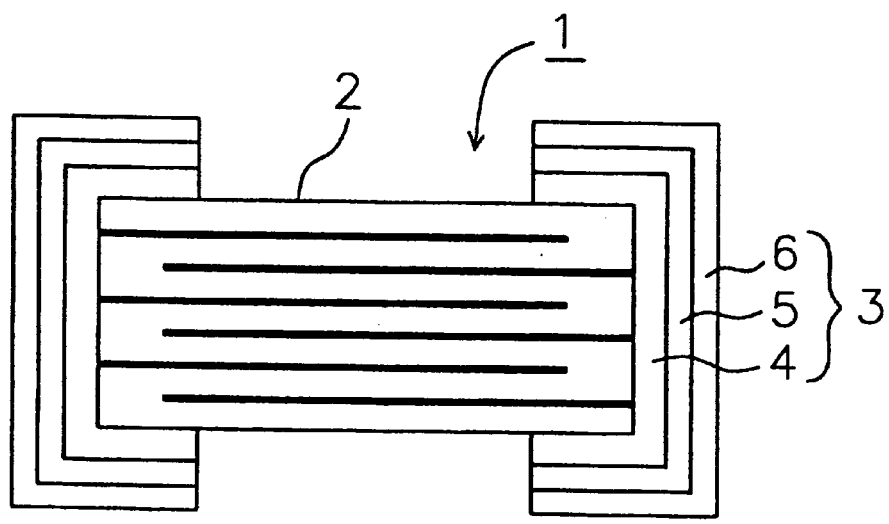
FIG. 1 is a sectional view showing an embodiment of the invented electronic part.

The inventors of the present invention made intensive investigations and found that there is a correlation between the average crystal grain size of a Sn plating layer and the magnitude of formation of whiskers when whiskers are formed in the Sn plating layer in such surroundings where high temperature conditions and low temperature conditions are repeated. Specifically, the present inventors found that the formation of whiskers can be retarded by fining the crystal grains of the Sn plating layer, specifically by rendering the average crystal grain size to be about 1 μm or less.

Specifically, the invented electronic part includes a body and an outer electrode formed on the surface of the body, and the outer electrode includes plural layers and has a Sn plating layer as the outermost layer. In the electronic part, the Sn plating layer has an average crystal grain size of about 1 μm or less. By configuring the Sn plating layer formed as the outermost layer of the outer electrode to have an average crystal grain size of about 1 μm or less, the formation of whiskers in the outer electrode can be inhibited even in surroundings where high temperature conditions and low temperature conditions are repeated. When the electronic part having the aforementioned outer electrode is installed in a circuit board, electric short-circuit between the electronic part and an adjacent part or wiring pattern can be inhibited, and this electronic part is adaptable to higher packing densities of circuit parts in the future.

Preferably, a Ni layer or Ni alloy layer is formed under the Sn plating layer. When a Sn plating layer is formed as an outer electrode of an electronic part as in the present invention, the Ni layer or Ni alloy layer is necessary for preventing a thick film electrode formed on the surface of a body from melting in and being absorbed by solder and for improving the solder temperature resistance of the outer electrode. In addition, the Ni layer and Ni alloy layer can concurrently advantageously inhibit the formation of whiskers at constant temperatures.

The Sn plating layer can be formed by a wet plating technique such as electroplating. When the outer electrode is formed on the surface of a ceramic body such as a ceramic or glass, the Sn plating layer is preferably formed using a plating bath with a pH of about 3 to 10. A strongly acidic or a strongly alkaline plating bath may corrode these ceramic bodies.

FIG. 1 is a sectional view showing a chip type multilayer ceramic capacitor 1. The chip type multilayer ceramic capacitor 1 mainly includes a ceramic body 2 and U-shaped outer electrodes 3 formed at both ends of the ceramic body 2. The outer electrode includes a thick film electrode 4 formed abutting on the ceramic body 2, a Ni plating layer 5 formed on the thick film electrode 4, and a Sn plating layer 6 formed on the Ni plating layer 5 and constituting the outermost layer of the outer electrode. The thick film electrode 4 can be formed by baking of a Ag paste, the Ni plating layer 5 by electroplating with Ni, and the Sn plating layer 6 by electroplating with Sn. In this connection, the thick film electrode 4 may be formed by using a Cu paste instead of the Ag paste, and the Ni plating layer 5 may be formed as a Ni alloy plating layer.

The Sn plating layer 6 of the aforementioned electronic part was formed by using plating baths (Examples 1 to 3, and Comparative Examples 1 to 4) under conditions shown in the following Tables 1 to 7 to yield a series of Sn plating layers having different average crystal grain sizes. The average crystal grain size of a Sn plating varies with plating conditions such as the types and ratios of composing agents of a plating bath and electric current density, and Sn plating layers having target average crystal grain sizes could be obtained by controlling the plating conditions. The plating baths were set to have pH of about 3 to 10 in order to avoid the corrosion of the ceramic body 2, and the pH in each plating bath was adjusted by adding an aqueous ammonia to the plating bath. In the present embodiment, citric acid and gluconic acid, which are weakly acidic to weakly alkaline complexing agents, were used as complexing agents for tin. However, the complexing agents are not limited to these agents. The other plating conditions can be optionally arranged according to the objects of the invention.

TABLE 1

Example 1

| Plating Bath Composition | |
| --- | --- |
| Tin sulfate | 20 g/l |
| Diammonium hydrogen citrate | 50 g/l |
| Ammonium sulfate | 60 g/l |
| Lauryldimethylaminoacetic acid betaine | 0.4 g/l |
| Formalin | 0.35 g/l |
| Hydroxybenzaldehyde | 0.07 g/l |
| Polyethylene glycol #6000 | 0.08 g/l |
| Aqueous ammonia | appropriate amount to reach pH |
| pH | 5.0 |
| Current Density | 1.0 A/dm$^2$ |
| Bath Temperature | room temperature |

TABLE 2

Example 2

| Plating Bath Composition | |
| --- | --- |
| Tin sulfamate | 50 g/l |
| Gluconic acid | 100 g/l |
| Ammonium sulfate | 100 g/l |
| Lauryldimethylaminoacetic acid betaine | 0.5 g/l |
| Formalin | 0.15 g/l |
| Chlorobenzaldehyde | 0.05 g/l |
| Polyethylene glycol #6000 | 0.1 g/l |
| Aqueous ammonia | appropriate amount to reach pH |
| pH | 10.0 |
| Current Density | 0.3 A/dm$^2$ |
| Bath Temperature | room temperature |

TABLE 3

Example 3

| Plating Bath Composition | |
| --- | --- |
| Tin sulfamate | 30 g/l |
| Gluconic acid | 100 g/l |
| Ammonium sulfate | 120 g/l |
| Formalin | 0.15 g/l |
| Chlorobenzaldehyde | 0.05 g/l |
| Polyoxyethylene-oxypropylene block | 0.1 g/l |

TABLE 3-continued

Example 3

| | |
|---|---|
| polymer | |
| Aqueous ammonia | appropriate amount to reach pH |
| pH | 3.0 |
| Current Density | 0.5 A/dm² |
| Bath Temperature | room temperature |

TABLE 4

Comparative Example 1

Plating Bath Composition

| | |
|---|---|
| Tin sulfate | 60 g/l |
| Diammonium hydrogen citrate | 150 g/l |
| Ammonium sulfate | 160 g/l |
| Polyoxyethylenealkylamine | 1 g/l |
| Veratrum aldehyde | 0.5 g/l |
| Aqueous ammonia | appropriate amount to reach pH |
| pH | 5.0 |
| Current Density | 0.2 A/dm² |
| Bath Temperature | room temperature |

TABLE 5

Comparative Example 2

Plating Bath Composition

| | |
|---|---|
| Tin sulfate | 50 g/l |
| Diammonium hydrogen citrate | 50 g/l |
| Ammonium sulfate | 60 g/l |
| Polyoxyethylenealkylamine | 1 g/l |
| Aqueous ammonia | appropriate amount to reach pH |
| pH | 6.0 |
| Current Density | 0.5 A/dm² |
| Bath Temperature | room temperature |

TABLE 6

Comparative Example 3

Plating Bath Composition

| | |
|---|---|
| Tin sulfate | 60 g/l |
| Diammonium hydrogen citrate | 150 g/l |
| Ammonium sulfate | 160 g/l |
| Lauryldimethylaminoacetic acid betaine | 0.5 g/l |
| Aqueous ammonia | appropriate amount to reach pH |
| pH | 5.2 |
| Current Density | 0.4 A/dm² |
| Bath Temperature | room temperature |

TABLE 7

Comparative Example 4

Plating Bath Composition

| | |
|---|---|
| Tin sulfate | 60 g/l |
| Diammonium hydrogen citrate | 150 g/l |
| Ammonium sulfate | 160 g/l |
| Lauryldimethylaminoacetic acid betaine | 0.5 g/l |
| Aqueous ammonia | appropriate amount to reach pH |

TABLE 7-continued

Comparative Example 4

| | |
|---|---|
| pH | 5.2 |
| Current Density | 2.0 A/dm² |
| Bath Temperature | room temperature |

A series of electronic parts having Sn plating layers 6 formed by using the above plating baths were left standing in surroundings where high temperature conditions and low temperature conditions were repeated. The relationship between the average crystal grain size of the Sn plating layer and the formation of whiskers was then determined. Concretely, each electronic part was left standing under conditions with a temperature change of from −40° C. to 85° C., a holding time (including a time necessary to change the temperature) of 30 minutes, a time to change the temperature of 3 to 5 minutes, and repeating the cycles of temperature change 1000 times. The electronic part was then subjected to measurements of the average crystal grain size of the Sn plating layer, the density of formed whiskers and the maximum length of whiskers, using a scanning electron microscope (SEM) and a scanning ion microscope (SIM). The results are shown in Table 8.

TABLE 8

| | Average crystal grain size of Sn plating layer (mm) | Density of formed whiskers (number/mm²) | Maximum length of whiskers (mm) |
|---|---|---|---|
| Example 1 | 0.5 | 0 | 0 |
| Example 2 | 0.6 | 0 | 0 |
| Example 3 | 0.9 | 0 | 0 |
| Comp. Ex. 1 | 1.4 | 23 | 15.4 |
| Comp. Ex. 2 | 2.0 | 662 | 47.5 |
| Comp. Ex. 3 | 3.0 | 1288 | 60.0 |
| Comp. Ex. 4 | 5.0 | 1596 | 77.5 |

The above results show that the formation of whiskers is inhibited in Sn plating layers formed by using the plating baths according to Examples 1 to 3 and having an average crystal grain size of about 1 μm or less, even in surroundings where high temperature conditions and low temperature conditions are repeated. In contrast, whiskers are formed in Sn plating layers formed by using the plating baths according to Comparative Examples 1 to 4 and having an average crystal grain size exceeding about 1 μm in surroundings where high temperature conditions and low temperature conditions are repeated, and the magnitude of formation of whiskers increases with an increasing average crystal grain size.

Plating layers are classified according to whether the plating layer has a luster or not in some cases. However, the presence or absence of luster is on the basis of the magnitude of reflected light due to the flatness of the surface of the plating layer, and has no direct relationship with the average crystal grain size specified in the present invention.

In the above embodiment, a chip type multilayer ceramic capacitor is used as the electronic part, but the electronic part is not limited to this type of part, and the present invention can be applied to any chip type electronic parts such as chip type ceramic coils and chip type ceramic thermistors.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method for producing an electronic part, comprising the steps of:

providing a ceramic body;

forming a thick film electrode on a surface of the ceramic body;

forming a layer comprising Ni or Ni alloy on the thick film electrode; and forming a Sn plating layer having an average crystal grain size of about 1 µm or less on the Ni or Ni alloy layer by electroplating in a plating bath having a pH of about 3 to 10 to form an electric part having an electrode thereon.

2. A method for producing an electronic part according to claim 1, comprising forming a thick film electrode on two spaced apart surfaces of the ceramic body;

forming a layer comprising Ni or Ni alloy on each thick film electrode; and forming a Sn plating layer having an average crystal grain size of about 1 µm or less on each Ni or Ni alloy layer by electroplating in a plating bath having a pH of about 3 to 10.

3. A method for producing an electronic part according to claim 2, wherein the thick film electrode comprises Cu or Ag.

4. A method for producing an electronic part according to claim 3, wherein the Sn plating layer is formed to have an average crystal grain size of 0.9 µm or less.

5. A method for producing an electronic part according to claim 2, wherein the Sn plating layer is formed to have an average crystal grain size of 0.9 µm or less.

6. A method for producing an electronic part according to claim 1, wherein the Sn plating layer is formed to have an average crystal grain size of 0.9 µm or less.

7. A method for producing an electronic part according to claim 1, wherein the thick film electrode comprises Cu or Ag.

* * * * *